Patented Aug. 16, 1927.

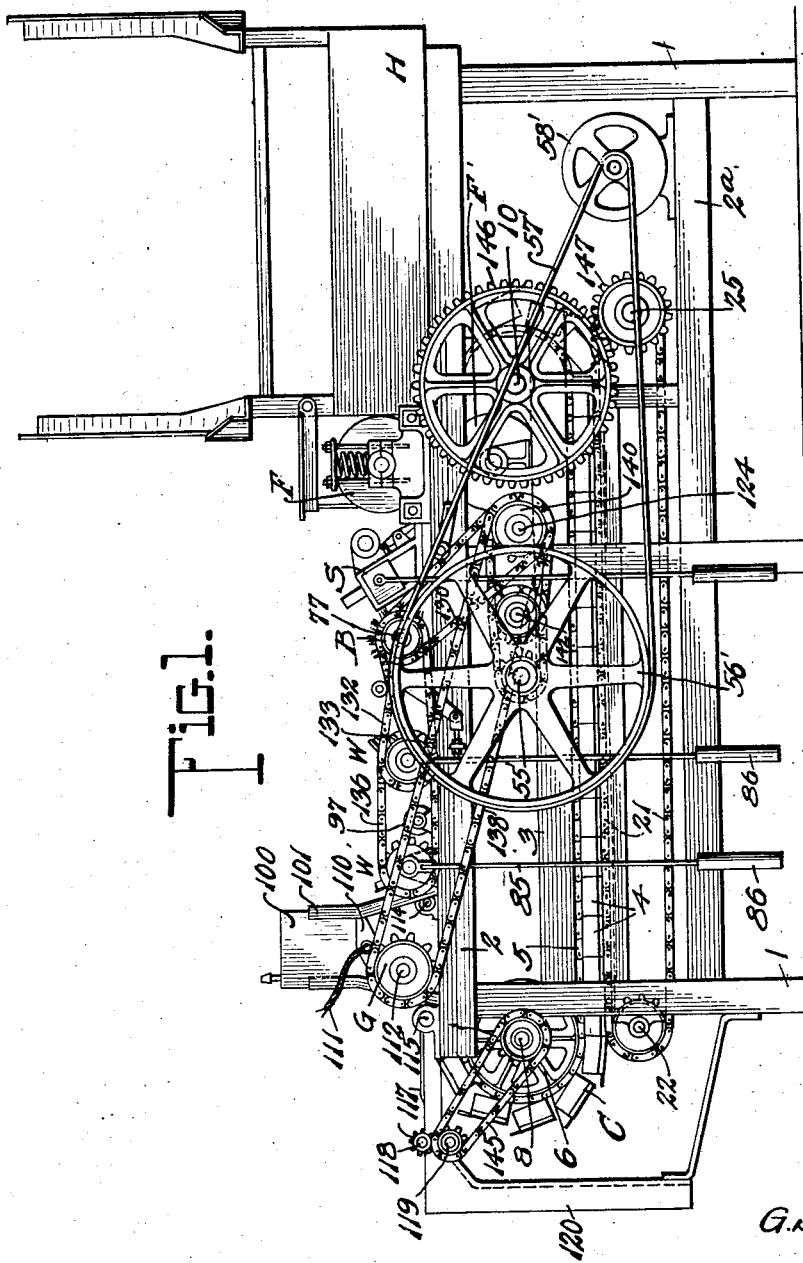

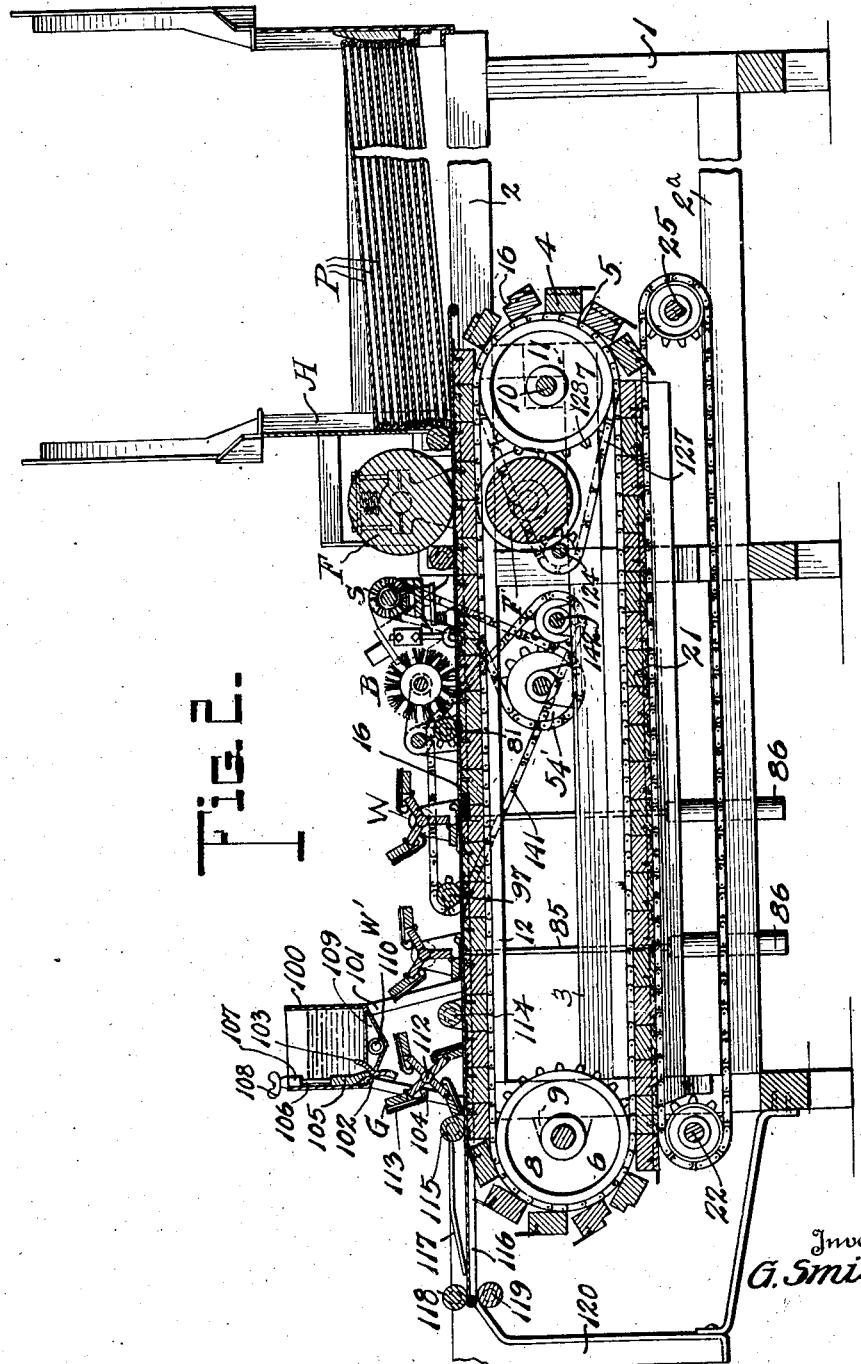

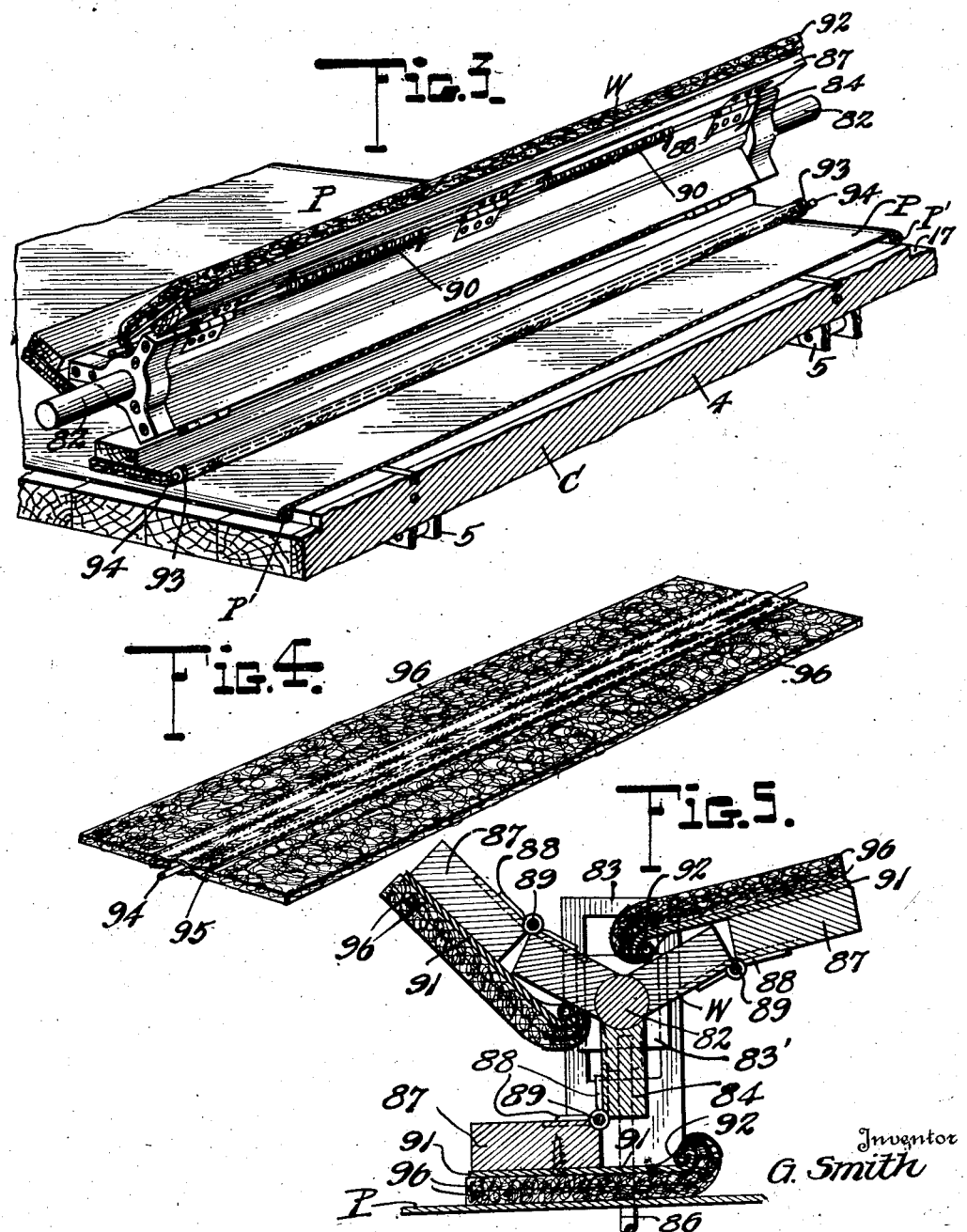

1,639,540

UNITED STATES PATENT OFFICE.

GEORGE SMITH, OF RICHMOND, VIRGINIA.

PAN-TREATING APPARATUS.

Original application filed April 17, 1925, Serial No. 23,980. Divided and this application filed June 11, 1926. Serial No. 115,403.

This invention relates to a pan treating apparatus, and comprises a division of my application for pan treating mechanism filed April 17, 1925, Serial Number 23,980, which has matured into Patent No. 1,615,727, granted Jan. 25, 1927.

The invention refers particularly to a device for engaging and traversing the surface of a pan and adapted for either a wiping function or the application of a coating thereto. The term "wiping" is used in this application in its broad sense and is not confined to a mere cleaning function but embraces cleaning, polishing or applying a coating to the surface of a pan.

In prior devices of this character a rotary brush member has been used which only engages tangentially a limited area of the pan surface and is thus inefficient to completely wipe the surface or evenly apply a coating thereon. It is of importance in the preparation of these pans for baking purposes that the surface be properly greased in order to secure a uniform product in the baking operation. Insufficient grease results in sticking of the dough to the pan, while the application of too much grease is not only unnecessary waste and expense but results in a product in which the under surface is full of holes. It is therefore of importance to apply an even continuous coating of proper amount and the invention contemplates improved means for this purpose.

To obviate such objections and produce an improved product in the baking operation, I have provided a treating member adapted to engage a material area of the pan surface and travel parallel thereto during a portion of its movement, and further to provide a rotating contact member which may be used alone as a wiper or polisher for cleaning purposes or combined with a liquid feeding means to grease or coat the surface of a pan.

The invention has for an object to provide a novel and improved construction including a rotating member having a pivoted engaging surface adapted to swing upon its base during rotative movement and traverse the surface of a travelling pan in a plane parallel thereto and in contact with the pan for a portion of its rotative movement.

A further object of the invention is to provide an improved construction of the treating or wiping member secured to a rotating base and carrying a fabric having free ends extending in the direction of the pan travel and having a plurality of surfaces adapted to be separately used.

Another object of the invention is to provide an improved combination of parts in in which the pan is supported upon a moving conveyor in conjunction with a rotating device having an engaging member constructed to travel upon the pan surface parallel thereto during a portion of its rotation Another object of the invention is to combine the novel wiping device with a liquid feeding means by which the capillary feed is carried to the surface of the wiper in order to apply a continuous even coating upon the surface of a pan.

Other and further objects and advantages of the invention will be hereinafter set forth and the novel features thereof defined by the appended claims.

In the accompanying drawings:

Figure 1 is a side elevation of the machine;

Figure 2 is a central longitudinal section;

Figure 3 is a perspective view of one of the treating members;

Figure 4 is a like view of the polishing cloth before application; and

Figure 5 is a vertical section through the parts shown in Figure 3.

Like numerals designate corresponding parts throughout the several figures of the drawings.

While this invention is shown in connection with means for flattening, scraping, cleaning and greasing a pan, still it is applicable to machines embodying other mechanical elements, or for use independently of any cooperating mechanisms.

As illustrating one form of the invention the frame of the machine is provided with legs 1, upper and lower longitudinal sills 2 and 2ª respectively, there being also provided suitable cross members with which the sills are appropriately fastened to the legs. At each side of the machine throughout the major portion of its length intermediate sills 3 are provided for the purpose of supporting certain of the driving mechanism for the various instrumentalities which the machine includes.

Extending longitudinally of the frame and between the upper sills is a travelling bed or conveyor C which is adapted to engage and feed pans P to be acted upon by various appliances for flattening, scraping, brushing, wiping or polishing and greasing. These appliances are carried by the sills 2, excepting one of the elements of the pan flattening device which is supported by the sill 3. The conveyor C is formed of cross pieces or blocks 4 of suitable material which are connected to endless sprocket chains 5 which are trained over gears 6 and 7, the gear 6 at the delivery end of the machine being undriven and the gear 7 at the receiving end being driven.

The gears 6 are keyed upon the shaft 8 which rotates freely in bearings 9 while the gears 7 are carried by a shaft 10 mounted in bearings 11 on the sill 3. The bearing 11 is disposed substantially beneath the delivery from the pan hopper H at the front of the machine. To support the upper reach of the conveyor and prevent sagging thereof, opposite angle irons 12 extend inwardly from the inner faces of the sills 2 throughout substantially the length of the conveyor reach. The details of this conveyor and means for operating the same are specifically disclosed in my copending application aforesaid.

The pan shown in connection with this form of the invention is of the usual type used in bakeries and the body thereof is provided with a reinforced bead P' at all of its edges, the pan being preferably of rectangular shape and adapted to lie with its body portion in direct contact with the upper surface of the conveyor blocks which are formed with longitudinal grooves 16 of sufficient depth to permit the pan to contact with the upper surface of the block and a similar lateral recess 17 adjacent the ends of the block disposed to receive a pan bead at that point upon a number of the blocks. The recesses 16 are spaced from each other relative to the diameter of the pan upon which the mechanism is operating.

In order to support the lower reach of the conveyor and also drive the same to relieve the links of the chain of the driving strain, a plurality of carrier chains 21 have been provided and bear against the under face of the lower reach of the chain C. This carrier may be mounted upon sprockets on the shaft 22 at its rear while the forward end is carried upon a similar sprocket upon the shaft 25 which is preferably driven at a speed slightly greater than the blocks of the conveyor.

The pans P are fed from a hopper H positioned at the front of the frame and pass therefrom beneath flattening rollers F and F', and for this purpose the conveyor withdraws the lowermost pan from the hopper and feeds it forward into the operative field of a scraping device, as indicated at S. The material loosened by this scraper is removed by the brush B and the feed of the pan with the conveyor continues until it reaches the wiping and polishing elements W and W' which embody the novel construction of the present invention and the element W is adapted to thoroughly wipe the surface of the pan while the element W' which is of identical construction performs a polishing function. While two of these elements are shown, it will be obvious that one may be used or a greater number if the conditions of operation prove the same desirable.

The wiping element W comprises a shaft 82 mounted in bearing brackets 83 upon the upper sill 2 and carrying a frame having radiating arms or wings 84. The number of these arms may be varied at will, three being shown in Figure 5. The shaft and its arms are driven in an opposite direction to the travel of the conveyor C and this shaft is supported for relative vertical movement in the brackets 83 by sliding bearings 83' tensioned toward the pan or conveyor by means of dependent rods 85 carrying weights 86 at opposite ends of the shaft 82.

Secured to the arms are leaves or extensions 87 by means of pivotal joints 88 through which a longitudinally extending rod 89 extends. Coiled about this rod is a spring member 90 bearing at its opposite ends upon the arms and extensions 87 so as to normally force these parts toward the same plane. Each of the extensions 87 has secured thereto a longitudinally extending plate 91, one edge 92 of which is curved inwardly and overlaps the supporting wing 84 to which the extension is pivoted. This inwardly curved longitudinal edge of the plate 91 is provided at each end with ears 93 for removably supporting a rod 94 which is passed through a fabric binding 95 carrying at its opposite edges the wiping strips 96 of relatively stout material which are coextensive with the plates 91.

As shown in Figures 3 and 5, when the shaft 82 is rotated the extensions are bent rearwardly by contact with the pan P and the self wiping plies or strips 96 are brought into superposed relation against the surface of the pan in a plane parallel thereto. It will be obvious that by removing the rod 94 and reversing the position of the ends of the binding strip a clean ply may be brought from its previous superposed position and disposed to bear upon the pan surface. These plies can obviously be shifted so that each one of its two sections would be brought into direct contact with the pan which effects a material economy as the four surfaces of one wiping unit can be used for different periods of cleaning.

As the rotation of the wiper shaft is counter to the direction of movement of the pans, it is desirable to provide a holding roller 97 intermediate the first and second wipers in order to retain the pan in proper position. This roller is driven in the direction of movement of the conveyor and serves to accelerate such movement. The second wiping element W' is similar to that just described and is likewise maintained under yielding tension.

Grease applicator.

The pans having been thoroughly cleaned are now ready to receive the thin coating of grease, after which they will be passed to the machine for depositing the dough for a new batch of cakes. The grease for application to the pans is contained in a receptacle 100 mounted upon brackets 101, as shown in Figure 2. This receptacle extends transversely across the frame and has a trough-like portion 102 at its bottom provided with a slot co-extensive with its length and through which a wick 103 extends, the function of which is to supply grease by a capillary feed to a rotary applicator 104 which is similar in construction to the wiping or treating devices W and W' before described.

The flow of grease through the wick is controlled by means of a strip 105 which is adapted to bear against the wick to compress the same against a wall of the trough slot 102. The strip is controlled by means of screw rods 106 which pass through top bearings 107 and are provided at their upper ends with finger grips 108. By tightening the strip firmly against the wick the flow of grease may be entirely cut off, while a variation of such pressure determines the amount of feed to the greasing element G.

Beneath the bottom of the receptacle 100 a chamber 109 is provided which is accessible from one end and adapted to receive any desired heating means such as an electric coil 110 to which current may be supplied by a suitable conductor 111 indicated in Figure 1. The function of the heater is to maintain a proper temperature of the grease in the receptacle so that its liquid condition will cause it to freely feed through the wick and it is also desirable that the side and bottom walls of the chamber 110 be suitably insulated so that the heat generated will be directed against the bottom of the receptacle. The grease applicator 104 comprises essentially a shaft 112 which is driven in a direction counter to the travel of the pans and the wings of which carry the fabric contact members 113 these being disposed to engage the depending end of the wick during their rotation. The number of such wings may be varied at will, four being herein shown as found sufficient to properly and evenly grease the surface of a pan passing thereunder.

At opposite sides of the greasing element G additional holding rollers 114 and 115 are disposed and driven in the same direction as the travel of the pan which act to hold the pan in the rabetted portion of the conveyor during its continuous movement. The pans pass from the greasing element upon the delivery extension 116, being held thereon by a guide element 117 until the free edge of the pan is engaged by the delivery rolls 118 and 119, respectively, which are driven in the direction of the travel of the pans at a greater speed thus causing a forcible withdrawal of the pan from the conveyor and its delivery into a suitable hopper, as indicated at 120.

Driving mechanism.

Any desired form of driving mechanism may be used for actuating the treating members comprising the present invention in the directions of rotation as previously stated. A desirable form comprises a motor 58' mounted upon the sills 2ᵃ and driving a pulley wheel 56' upon the main driving shaft 55' of the machine by means of the belt 57'.

The conveyor C is driven by a sprocket and chain connection from shaft 55' to shaft 124 from which chain 127 extends to the large sprocket gear 128 on shaft 10. This shaft 10 also carries a gear 146 meshing with gear 147 on shaft 25 for driving the chains 21. The shaft 77 of the brush element B is driven counter to the direction of movement of the conveyor by a connecting chain 130 from shaft 124. From the shaft 77 a chain drive 133 extends to the shaft 82 of the wiper W, while from the latter shaft a chain drive 136 extends to the shaft of the element W'. The shaft 112 of the grease applicator G is connected by a chain drive 138 from the shaft 124, Figure 1. The holding rolls 81 and 97 are driven by chain 141 from shaft 142 properly actuated from shaft 55', Figure 2. The delivery rolls 118 and 119 are geared together and driven at an accelerated speed by the chain and sprocket connection 145 from the shaft of the rear gear 6, Figure 1.

The operation of the invention will be apparent from the foregoing description from which it will be seen that the pans are fed from beneath the scrapers and brush to the first wiper and thence to the polishing wiper from which they are delivered to the grease applying wiper. An essential novel feature of the invention is the structure of the wiping or coating members which is also embodied in the greasing unit, and this comprises the pivoted leaves carried by the radial arms which cause the fabric wipers to rest in parallel contact with the pan for an extended period during the rotation of the wiper, and further permits the removal and reversal of the wipers so as to materially extend their period of usefulness. Such a structure provides a single unit capable of application for cleaning, polishing, greasing or similar purposes when it is desired to secure a complete and even contact with the entire surface of a pan.

The invention also presents an important improvement in the feeding mechanism from the grease reservoir which prevents an excess of grease being applied to the pan and controls the capillary feed through the wick to determine the proper amount to prevent a deleterious action upon the cakes subsequently baked which would occur were too little or an excess of grease applied.

While the specific construction of this treating device has been shown and described, the invention is not confined thereto as changes and alterations may be made without departing from the spirit of the invention as defined by the following claims.

Having thus described my invention, what I claim as new and desire to secure by Letters Patent is:—

1. A pan treating mechanism including a body rotatable upon a horizontal axis and having a fixed support radial thereto, a contact member pivoted upon said support to swing into a position at an angle thereto when engaging a cooperating surface, and a wiper carried by said member.

2. A pan treating mechanism including a body rotatable upon a horizontal axis and having a fixed support radial thereto, a contact member pivoted upon said support to swing into a position at an angle thereto when engaging a cooperating surface, and a wiper carried by said member and extended therefrom toward the axis of the body.

3. A pan treating mechanism including a body rotatable upon a horizontal axis and having a fixed support radial thereto, a contact member pivoted upon said support to swing into a position at an angle thereto when engaging a cooperating surface, and a wiper carried by said member and extended therefrom to overlap and engage said radial support.

4. A pan treating mechanism including a body rotatable upon a horizontal axis and having a fixed support radial thereto, a rigid contact member pivoted to said support at its edge next said axis, and a carrier for a wiper secured to said member and extended toward the axis of the body to overlap the joint between the support and contact member.

5. In a pan treating apparatus, a rotatable member, and a flexible engaging member secured thereto and embracing a plurality of surfaces normally cooperatively operable and supported upon said member for change in position relative thereto, whereby said surfaces may be separately used as an outer face for contact with the surface to be treated.

6. In a pan treating apparatus, a rotatable member, and a flexible wiper folded upon itself and detachably secured to the rotating member and with its free ends capable of reversal.

7. A pan treating member comprising a shaft, an arm extending radially therefrom, a leaf pivoted to said arm, and a flexible engaging surface mounted upon said leaf.

8. A pan treating member comprising a shaft, an arm extending radially therefrom, a leaf pivoted to said arm, a plate secured to said leaf and extending inward therefrom, and a flexible wiper pivotally mounted upon said plate.

9. A pan treating member comprising a shaft, an arm extending radially therefrom, a leaf pivoted to said arm, a plate secured to said leaf and extending inward therefrom, a flexible wiper having a central binding, and a pivoting rod mounted upon the plate and extending through said binding.

10. A pan treating device comprising a shaft, a radial arm therefrom, a leaf pivoted to said arm, a tension spring disposed to project said leaf radially, and a flexible contacting surface mounted upon said leaf and extending over a material area of the arm.

11. A pan treating device comprising a shaft, a radial arm therefrom, a leaf pivoted to said arm, a tension spring disposed to project said leaf radially, a plate mounted upon said leaf and extended over the joint between the arm and leaf, and a flexible wiper secured to the inner end of said plate and having a free outer end.

12. In a pan treating apparatus, a pan conveyor, a liquid reservoir having a feed slot in its lower portion, a capillary wick feed extending through said slot and into the reservoir, a strip disposed within the reservoir and cooperating with a wall of said slot to compress the wick into contact therewith, means for adjusting said strip, and a rotary applicator having pivoted wiper wings extending transversely of the conveyor and disposed to secure extended contact with said wick and a pan upon the conveyor.

13. In a mechanism of the class described, a conveyor having means for supporting a pan thereon, a wiping device including a shaft having a radial wing, a leaf pivotally connected to said wing, and flexible wipers secured at one end of said leaf.

14. In a mechanism of the class described, a conveyor having means for supporting a pan thereon, a wiping device including a shaft having a radial wing, a leaf pivotally connected to said wing, and a folded flexible wiper secured intermediate its free edges to said leaf.

15. In a mechanism of the class described, a conveyor having means for supporting a pan thereon, a wiping device including a shaft having a radial wing, a leaf pivotally connected to said wing, means for tensioning said leaf toward the plane of said wing, and means for tensioning said shaft toward the conveyor.

16. In a mechanism of the class described, a conveyor having means for supporting a pan thereon, a wiper device including a shaft provided with radial wings, leaves pivoted to said wings, supporting plates extending from said leaves to overlap said wings, and means at one edge of said plate for supporting a flexible wiper thereon.

17. In a mechanism of the class described, a conveyor having means for supporting a pan thereon, a wiper device including a shaft provided with radial wings, leaves pivoted to said wings, supporting plates extending from said leaves to overlap said wings, and a flexible wiper comprising members adapted to be folded upon each other and removably and reversibly supported by said plate.

18. In a pan treating apparatus, a pan conveyor, a liquid reservoir having a feed opening at its lower portion, a capillary wick feed extending through said opening and depending vertically from the reservoir, and a rotary applicator having flat faces disposed in their path of travel to effect extended engagement with said wick and a pan upon said conveyor.

19. In a pan treating apparatus, a pan conveyor, a liquid reservoir having a feed opening at its lower portion, a capillary wick feed extending through said opening and depending vertically from the reservoir, a rotary applicator having flat faces disposed in their path of travel to effect extended engagement with said wick and a pan upon said conveyor, and a heating chamber beneath said reservoir bottom and adjacent said wick.

In testimony whereof I affix my signature.

GEORGE SMITH.